(12) United States Patent
Roberts et al.

(10) Patent No.: US 7,079,840 B2
(45) Date of Patent: Jul. 18, 2006

(54) APPARATUS AND METHOD FOR IMPLEMENTING SYSTEM INFORMATION ACQUISITION IN UNIVERSAL MOBILE TELECOMMUNICATIONS SYSTEM USER EQUIPMENT

(75) Inventors: Gideon Roberts, Stone (GB); Andrew Farnsworth, Bromsgrove (GB)

(73) Assignee: M-Stack Limited, Birmington (GB)

( * ) Notice: Subject to any disclaimer, the term of this patent is extended or adjusted under 35 U.S.C. 154(b) by 166 days.

(21) Appl. No.: 10/775,030

(22) Filed: Feb. 9, 2004

(65) Prior Publication Data

US 2005/0177623 A1 Aug. 11, 2005

(51) Int. Cl.
*H04Q 7/20* (2006.01)
(52) U.S. Cl. .............. 455/434; 455/435; 455/436; 455/445; 370/252; 370/341; 370/347; 370/338
(58) Field of Classification Search .......... 455/434, 455/435, 436, 445; 370/252, 341, 347, 338
See application file for complete search history.

(56) References Cited

U.S. PATENT DOCUMENTS

| | | | |
|---|---|---|---|
| 6,594,238 B1 * | 7/2003 | Wallentin et al. | ........... 370/252 |
| 6,628,946 B1 | 9/2003 | Wiberg et al. | |
| 2002/0168985 A1 | 11/2002 | Zhao et al. | |

* cited by examiner

*Primary Examiner*—Joseph Feild
*Assistant Examiner*—Julio Perez

(57) ABSTRACT

In a mobile telecommunications system comprising a network of a plurality of cells and at least one user equipment device, the method comprises, in the user equipment device, when the user equipment has system information stored in the user equipment device, which system information has an associated expiration time limit, reading broadcast system information before the end of the expiration time limit and storing updated system information in the user equipment device.

6 Claims, 4 Drawing Sheets

APPARATUS AND METHOD FOR IMPLEMENTING SYSTEM INFORMATION ACQUISITION IN UNIVERSAL MOBILE TELECOMMUNICATIONS SYSTEM USER EQUIPMENT

BACKGROUND

1. Technical Field

This application relates to mobile telecommunications systems, for example UMTS (Universal Mobile Telecommunications System), in general and to an apparatus and method for implementing system information acquisition in mobile telecommunications system user equipment.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v.3.15.0, referred to herein as the 25.331 specification, addresses the subject of UMTS RRC (Radio Resource Control) protocol requirements between the UMTS Terrestrial Radio Access Network (UTRAN) and the UE.

Clause 8.1.1 of the 25.331 specification, relates to the broadcast of system information. The UTRAN sends system information to a UE by means of a message that comprises a Master Information Block (MIB) and a plurality of System Information Blocks (SIBs). The MIB provides references and scheduling information for a number of system infor mation blocks. A system information block groups together system information elements (IEs) of the same nature. Different system information blocks may have different characteristics, e.g. regarding their repetition rate and the requirements on UEs to re-read the system information blocks. The system information blocks contain the actual system information. The master information block may optionally also contain reference and scheduling information to one or two scheduling blocks, which give references and scheduling information for additional system information blocks. Scheduling information for a system information block is included in either the master information block or one of the scheduling blocks.

When a UMTS cell is selected by a mobile device, the master information block (MIB) is read on the broadcast control channel (BCCH) followed by the appropriate system information blocks (SIBs).

If the Universal Terrestrial Radio Access Network (UT-RAN) needs to change any of the system information blocks, it informs the mobile devices (UEs) in the cell. This is achieved by the UTRAN sending SYSTEM INFORMATION as illustrated generally in FIG. 1. As illustrated in FIG. 2, for UEs in Idle, Cell_PCH, or URA_PCH states, a PAGING TYPE 1 message (with the information element 'BCCH modification info' included) is sent via PCH to alert a UE that there is a change in system information. A separate mechanism is used to alert a UE in Cell_FACH if there is a change in system information. This entails using a SYSTEM INFORMATION CHANGE INDICATION message sent on the Forward Access CHannel (FACH) (as illustrated in FIG. 3).

In part 8.1.1 of the 25.331 standard (for instance Clauses 8.1.1.1.4, 8.1.1.5 and 8.1.1.6) it is stated that a UE may consider the content of the scheduling block or system information block as valid until it receives the same type of block or at most six hours after reception. If after six hours a SIB has not been re-read by the UE it is marked invalid and the UE has to re-acquire the SIB from the broadcast system information. In the meantime, the UE has no valid copy of the SIB which may lead to UTRAN messages being ignored or responded to incorrectly. For SIBS without value tags (e.g. SIB7), where the expiry timer has a value configured by the scheduling information, according to the prior art the SIB is also marked invalid on expiry of the timer and then re-acquired (clause 8.1.1.7.4).

There are therefore proposed strategies for dealing with the acquisition of system information. A number of such strategies are detailed below.

Other aspects and features of the present invention will become apparent to those ordinarily skilled in the art upon review of the following description of specific embodiments of an apparatus and method for handling the acquisition of system information in mobile telecommunications systems such as UMTS.

BRIEF DESCRIPTION OF THE DRAWINGS

Embodiments of the present invention will now be described, by way of example only, with reference to the attached drawings, in which.

The same reference numerals are used in different figures to denote similar elements.

DETAILED DESCRIPTION OF THE DRAWINGS

A method and apparatus for implementing system information acquisition is described. In the following description, for the purposes of explanation, numerous specific details are set forth in order to provide a thorough understanding of the present invention. It will be apparent, however, to one skilled in the art that the present invention may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for implementing system information acquisition in a mobile telecommunications device. In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices and/or within the network.

Figure 1:
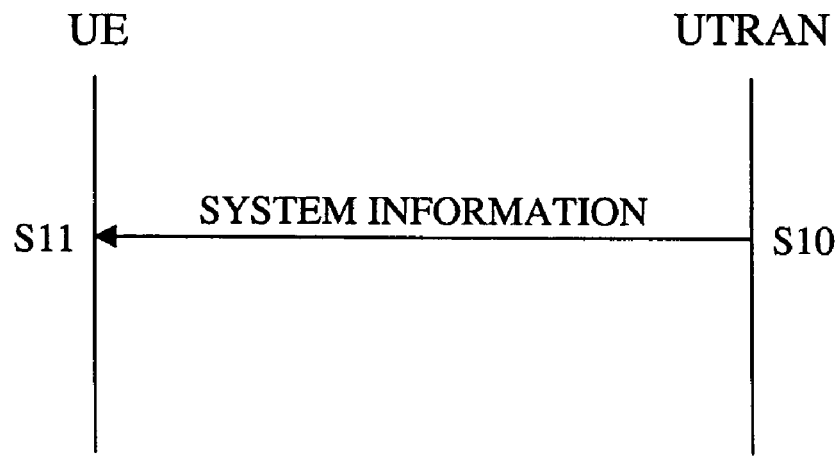
FIG. 1 illustrates the broadcast of system information in a UMTS system.
Figure 2:
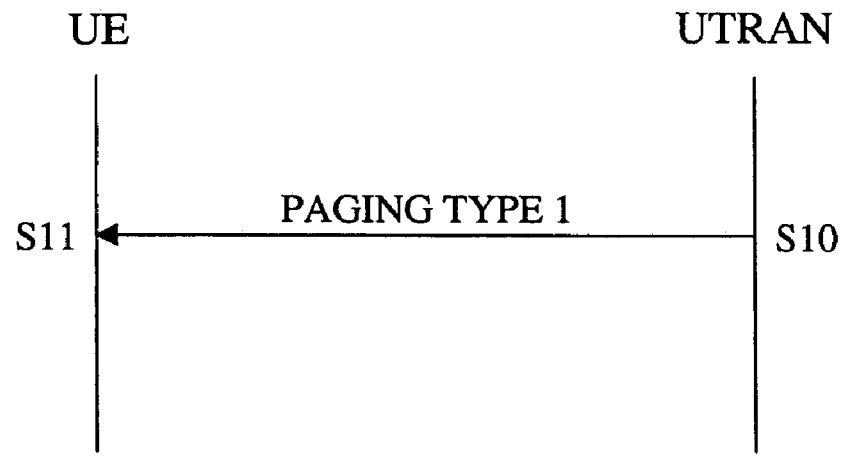
FIG. 2 illustrates notification of system information modification for UEs in Idle, Cell_PCH, or URA_PCH states.
Figure 3:
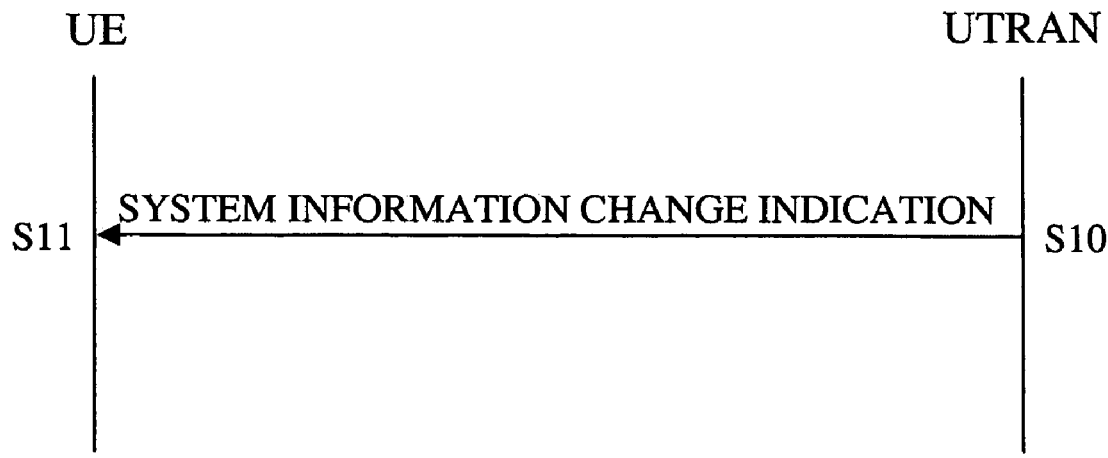
FIG. 3 illustrates notification of system information modification for UEs in CELL_FACH state.
Figure 4:
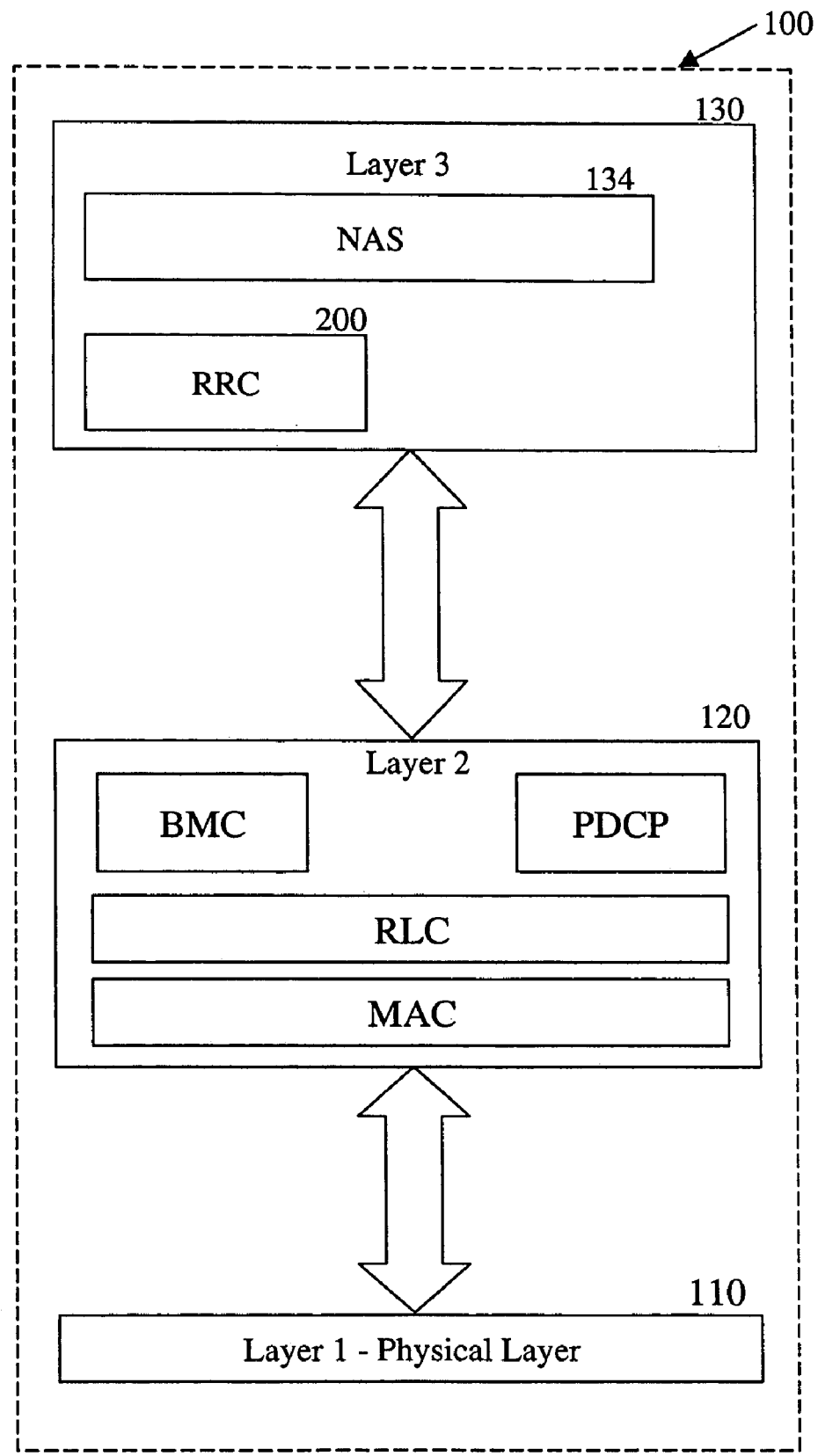
FIG. 4 is a block diagram illustrating an embodiment of a protocol stack apparatus.

Referring to the drawings, FIG. 4 is a block diagram illustrating an embodiment of a protocol stack apparatus provided with a RRC block, in accordance with the present application.

The RRC block 200 is a sub layer of Layer 3 130 of a UMTS protocol stack 100. The RRC 200 exists in the control plane only and provides an information transfer service to the non-access stratum NAS 134. The RRC 200 is responsible for controlling the configuration of radio interface Layer 1 110 and Layer 2 120. When the UTRAN wishes to change the UE configuration it will issue a message to the UE containing a command to invoke a specific RRC procedure. The RRC 200 layer of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

Figure 5:
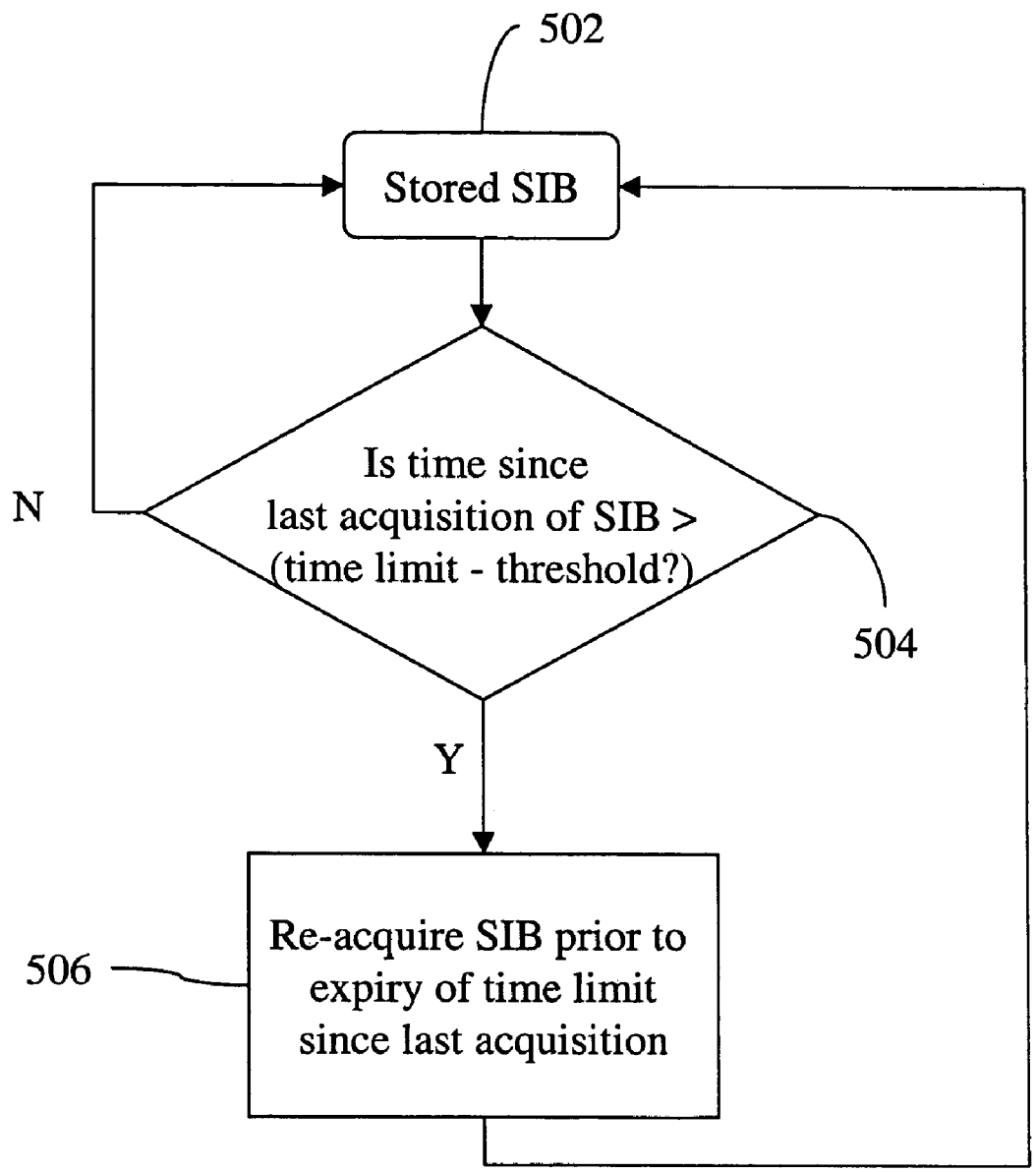
FIG. 5 is a flowchart illustrating an embodiment.

FIG. 5 is a flowchart that illustrates a first embodiment implemented on a UE device, applicable when a system information block received by the UE is nearing the end of a time period for which a SIB is valid e.g. the six hour period mentioned in clause 8.1.1.6 of the 25.331 standard or the expiry time for a SIB without value tags. When the user equipment has system information stored in the user equipment device, which system information has an expiration time limit, broadcast system information is read before the expiry of the expiration time limit and is stored as updated system information in the user equipment device.

As shown in FIG. 5, for a stored SIB (step 502) the UE determines whether the time since the last acquisition of the SIB is greater than an expiration time limit associated with the SIB minus a threshold (step 504). When the time since the last acquisition of the SIB is greater than a time limit minus a threshold (step 504), the UE then attempts to re-acquire the system information prior to the expiry of the time limit (step 506).

Figure 6:
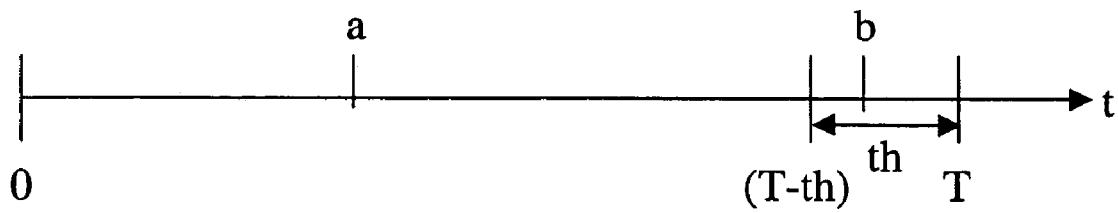
FIG. 6 is a timing diagram illustrating the operation.

FIG. 6 shows a timing diagram illustrating the operation of a system as described above. Consider a SIB received by a UE at t=0. Associated with the SIB is an expiration time limit T. The expiration time limit T for a stored SIB may be determined from in various ways, for instance a default time (eg. 6 hours) or from scheduling information/information elements contained in the MIB or SIB. For example, consider this expiration time limit T to be equal to 400 ms. Programmed into the UE is a threshold th which specifies the time before the expiration time limit in which an SIB should be re-acquired. The UE is arranged to re-acquire the SIB within this threshold before the expiration time limit. Thus, for instance, at t=a, the time since the last acquisition of the SIB (t=a) is less than T-th. The UE therefore does not need to re-acquire the SIB at this time. However, at t=b, the time since the last acquisition of the SIB (b) is greater than the time limit T minus the threshold th. The UE is then arranged to attempt to re-acquire, prior to the expiry of the time limit T, the system information.

The threshold is a value that indicates a period towards the end of the time limit. Considering a SIB with a value tag as discussed in the 25.331 standard, the time limit is 6 hours and the threshold is a value that is before the last transmission of the SIB according to the scheduling information in the preceding SIB transmission cycle (which is 4096 frames or 40.96 seconds) in the 6 hour time limit. Other suitable values for the threshold are 81.92 seconds (2 cycles), 10 cycles, 30 minutes (roughly 40 cycles), 2 hours etc.

The UE may implement the system information provided in the broadcast system information as soon as it is received or it may wait until the end of the expiration time limit T. In this latter case, the UE may be arranged to mark the newly acquired system information valid only at the expiry of the time limit T associated with the previous system information.

For a system information block with a value tag, the value of the threshold may be a few multiples of the system information repetition period so that the UE starts looking for a transmission of the SIB well before the end of the time limit. For the 25.331 standard example, where the time limit is 6 hours (21600 seconds), it is envisaged that the threshold may be orders of magnitude lower e.g. 216 seconds or less.

For a system information block without a value tag (e.g. SIB7), the expiration time is determined using scheduling information and possibly information elements contained within the SIB itself.

In the 25.331 standard, the expiration of SIB7 is given by Table 8.1.1 as "Expiration time=MAX(32, SIB_REP*ExpirationTimeFactor)".

SIB_REP is specified in Clause 10.3.8.16 as "Repetition period for the SIB in frames". ExpirationTimeFactor is provided in SIB7 and is a value in the range $2^1, 2^2, \ldots 2^8$.

For a system information block without a value tag (e.g. SIB7), the SIB will be acquired and decoded and then the expiry timer started. In the prior art, this presents a problem which may be illustrated using the following example. Consider SIB7 scheduled for transmission in frames 0, 16, 32, 48 etc., and the expiration timer for SIB7 has a value of 32 (320 ms). At frame 0 (t=0 ms), SIB7 is acquired by the UE and decoded. This process takes a finite amount of time, say 30 ms, and then the UE starts the expiration timer.

Owing to the acquisition/decoding time, the expiration timer will expire at t=350 ms. On expiry of the timer, the previous transmission of SIB7 (at t=320 ms) will have been missed, therefore the UE will now be without a valid SIB7 until the next SIB7 (broadcast at t=480 ms) has been acquired and decoded. However, according to the techniques described herein, the UE is arranged to attempt to re-acquire the SIB before the end of the expiration time limit and to store updated system information in the user equipment device. Thus, in the above example, a UE is arranged to start re-acquisition of the system information within a threshold, say of 40 ms, of the expiry of the expiration timer and thus the UE starts the attempt to re-acquire SIB7 at t=280 ms.

For SIBs without value tags, the UE is aware of the associated expiration timer values from the information as specified in Table 8.1.1 of 25.331. The value for the threshold for an SIB may be particular to that SIB based on the repetition period for the specific SIB and needs to be less than the repetition period for the specified SIB, but large enough to minimise the possibility of the UE being without valid system information.

Figure 7:
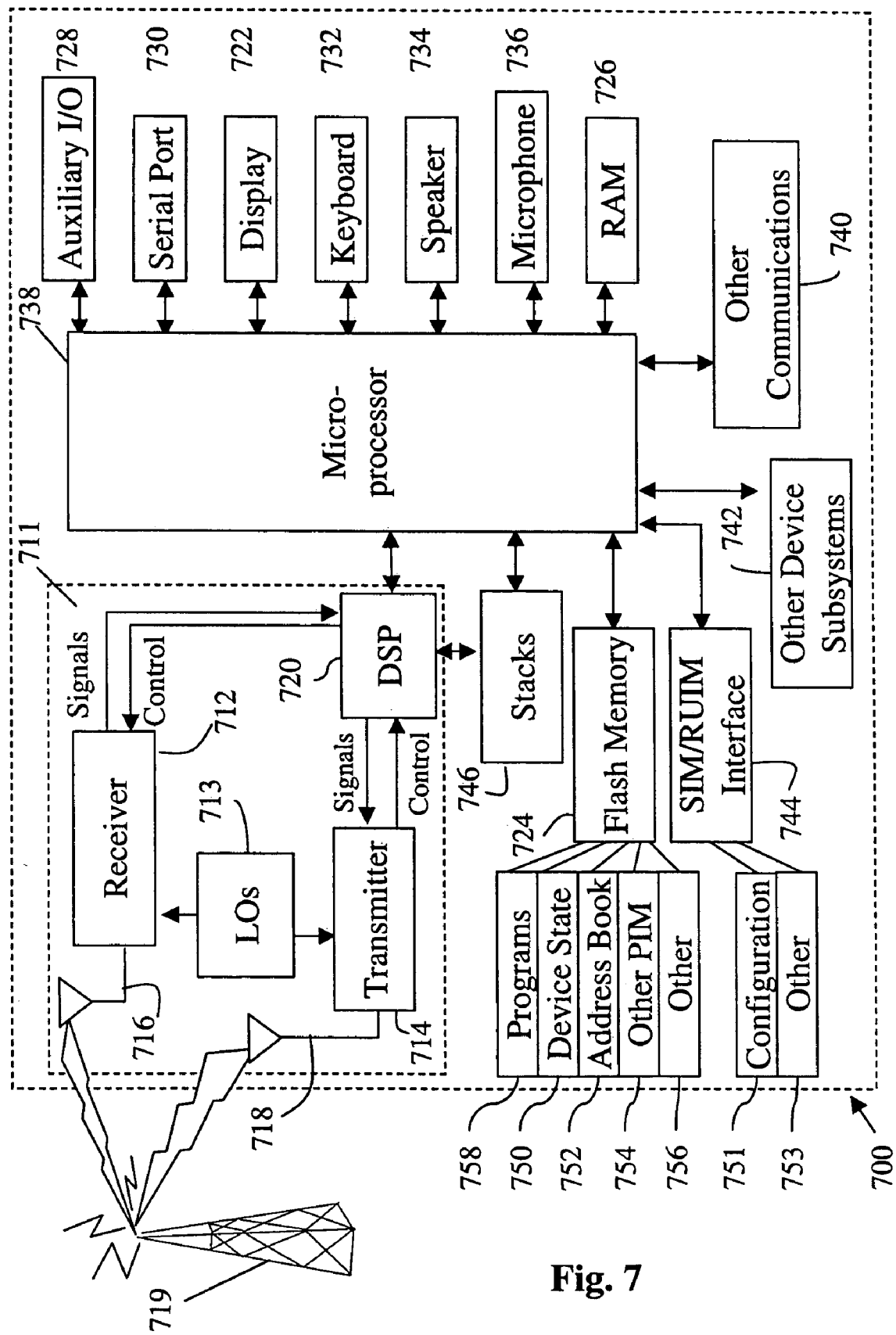
FIG. 7 is a block diagram illustrating a mobile device, which can act as a UE and co-operate with the apparatus and methods of FIGS. 1 to 6.

Turning now to FIG. 7, FIG. 7 is a block diagram illustrating a mobile device, which can act as a UE and co-operate with the apparatus and methods of FIGS. 1 to 7, and which is an exemplary wireless communication device. Mobile station 700 is preferably a two-way wireless communication device having at least voice and data communication capabilities. Mobile station 700 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, mobile station 700 may include a communication subsystem 711 designed to operate within the Mobitex™ mobile communication system, the DataTAC™ mobile communication system, GPRS network, UMTS network, or EDGE network.

Network access requirements will also vary depending upon the type of network 702. For example, in the Mobitex and DataTAC networks, mobile station 700 is registered on the network using a unique identification number associated with each mobile station. In UMTS and GPRS networks, however, network access is associated with a subscriber or user of mobile station 700. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 700 will be unable to carry out any other functions involving communications over the network 702. The SIM interface 744 is normally similar to a card-slot into which a SIM card can be inserted and ejected like a diskette or PCMCIA card. The SIM card can have approximately 64K of memory and hold many key configuration 751, and other information 753 such as identification, and subscriber related information.

When required network registration or activation procedures have been completed, mobile station 700 may send and receive communication signals over the network 702. Signals received by antenna 716 through communication network 702 are input to receiver 712, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 702 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile station 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, a short-range communications subsystem 740 and any other device subsystems generally designated as 742.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile station. A predetermined set of applications that control basic operations, including at least data and voice communication applications for example, will normally be installed on mobile station 700 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 702. In a preferred embodiment, the PIM data items are seamlessly integrated, synchronized and updated, via the wireless network 702, with the mobile station user's corresponding data items stored or associated with a host computer system. Further applications may also be loaded onto the mobile station 700 through the network 702, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile station 700.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of mobile station 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile station 700 is similar, except that received signals would preferably be output to a speaker 734 and signals for transmission would be generated by a microphone 736. Alternative voice or audio I/O subsystems, such as a voice message recording subsystem, may also be implemented on mobile station 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7, would normally be implemented in a personal digital assistant (PDA)-type mobile station for which synchronization with a user's desktop computer (not shown) may be desirable, but is an optional device component. Such a port 730 would enable a user to set preferences through an external device or software application and would extend the capabilities of mobile station 700 by providing for information or software downloads to mobile station 700 other than through a wireless communication network. The alternate download path may for example be used to load an encryption key onto the device through a direct and thus reliable and trusted connection to thereby enable secure device communication.

Other communications subsystems 740, such as a short-range communications subsystem, is a further optional component which may provide for communication between mobile station 700 and different systems or devices, which need not necessarily be similar devices. For example, the subsystem 740 may include an infrared device and associated circuits and components or a Bluetooth™ communication module to provide for communication with similarly enabled systems and devices.

When mobile device 700 is used as a UE, protocol stacks 746 include apparatus and a method for implementing system information acquisition in mobile telecommunications system user equipment.

EXTENSIONS AND ALTERNATIVES

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of the evaluation of some steps is immaterial with respect to the operation of the method. The ordering of the steps as described herein is not intended to be limiting.

It is also to be noted that where a method has been described it is also intended that protection is also sought for a device arranged to carry out the method and where features have been claimed independently of each other these may be implemented or claimed together with other claimed features.

What is claimed is:

1. A method for implementing system information acquisition in a mobile telecommunications system, the system comprising a network of a plurality of cells and at least one user equipment device, the method comprising, in the user equipment device:
when the user equipment has system information stored in the user equipment device, which system information has an associated expiration time limit, reading broadcast system information, the method characterised by reading the broadcast system information before the end of the expiration time limit minus a threshold and storing updated system information in the user equipment device, when the user equipment determines that a time since a last reading of the broadcast system information is greater than the expiration time limit minus the threshold.

2. A method according to claim 1 further comprising using the updated system information on expiry of the expiration time limit.

3. A method according to claim 1 wherein the threshold is greater than a repetition period for the system information.

4. A method according to claim 1 wherein the threshold is less than or equal to 10 times the repetition period for the system information.

5. A method according to claim 1 further comprising initiating the method only when the system information has an associated value tag.

6. Apparatus for implementing system information acquisition in a mobile telecommunications system, the system comprising a network of a plurality of cells and at least one user equipment device, the apparatus in the user equipment device being arranged such that:
when the user equipment has system information stored in the user equipment device, which system information has an associated expiration time limit, the user equipment reads broadcast system information, the apparatus characterised by user equipment reading the broadcast system information before the expiry of the expiration time limit minus a threshold and storing updated system information in the user equipment device, when the user equipment determines that a time since a last reading of the broadcast system information is greater than the expiration time limit minus the threshold.

* * * * *